(12) United States Patent
Jeffrey et al.

(10) Patent No.: US 12,130,224 B2
(45) Date of Patent: Oct. 29, 2024

(54) TEST PLATFORM APPARATUS

(71) Applicant: Sidus Space, Inc., Merritt Island, FL (US)

(72) Inventors: Ryan Jeffrey, Cape Canaveral, FL (US); Carol Craig, Merritt Island, FL (US); Anthony Boschi, Merritt Island, FL (US); Michael Bush, Washington, IL (US)

(73) Assignee: Sidus Space, Inc., Merritt Island, FL (US)

( * ) Notice: Subject to any disclaimer, the term of this patent is extended or adjusted under 35 U.S.C. 154(b) by 302 days.

(21) Appl. No.: 17/854,145

(22) Filed: Jun. 30, 2022

(65) Prior Publication Data

US 2024/0003804 A1    Jan. 4, 2024

(51) Int. Cl.
*G01N 17/00* (2006.01)
(52) U.S. Cl.
CPC .................................. *G01N 17/002* (2013.01)
(58) Field of Classification Search
CPC ......... G01N 17/002; G01N 2203/0246; G01N 2223/305; B64G 1/50; B64G 1/66; B64G 2007/005; B64G 7/00
See application file for complete search history.

(56) References Cited

U.S. PATENT DOCUMENTS

| | | |
|---|---|---|
| 2007/0029446 A1 | 2/2007 | Mosher |
| 2010/0103674 A1* | 4/2010 | Lai ........................... F21V 29/75 362/373 |
| 2017/0361948 A1 | 12/2017 | Lumaca |
| 2022/0017238 A1 | 1/2022 | Mehra |

FOREIGN PATENT DOCUMENTS

CN    108711332 A  * 10/2018    ............... G09B 9/00

OTHER PUBLICATIONS

International Search Report from the international search authority for international application No. PCT/US2023/069040 mail dated Sep. 28, 2023.
Written Opinion from the international search authority for international application No. PCT/US2023/069040 mail dated Sep. 28, 2023.

* cited by examiner

*Primary Examiner* — John Fitzgerald
*Assistant Examiner* — Truong D Phan
(74) *Attorney, Agent, or Firm* — Mark Malek; Jonathan D. Staudt; Widerman Malek, PL

(57) ABSTRACT

A modular satellite apparatus for testing materials in a space setting is provided. The apparatus includes a lower member and an upper member, as well as rear support members, medial support members, front support members, and side members that each extend between the lower member and the upper member. They apparatus also includes attachment members connected to an external surface of the lower member and configured to connect to an external platform. The apparatus further includes a plurality of mounting members on an internal surface of the lower member or the side members, and a plurality of heatsinks. The lower member includes a plurality of heatsink receiving holes formed therein to receive portions of the heatsinks to connect the heatsinks to the lower member.

35 Claims, 18 Drawing Sheets

TEST PLATFORM APPARATUS

FIELD OF THE INVENTION

The present invention relates to the field of test platforms for use in space. More specifically, the present invention relates to an apparatus for conducting experiments involving carrying materials and technologies to be exposed to the vacuum of space in low earth orbit on a testing platform.

BACKGROUND OF THE INVENTION

In recent history there has been a growing interest in space technology and an increasing commercialization of space technology. In order for technology and materials to be tested for the effectiveness and resilience of being exposed to the harsh environment present in the vacuum of space and low earth orbit, machines that mimic the vacuum of space have been used. However, there is limited availability for testing the materials and technology in real low earth orbit for exposure to the harsh vacuum of space and to also have the option to return the materials and technology from their low earth orbit. The prior art lacks the ability to implement a modular design that can allow for a variety of configurations and payloads in order to accommodate a vast number of different users to have materials and technology taken into low earth orbit. This creates a need for a testing platform with an effective design and low turnover time and cost that is highly configurable and capable of taking a payload into low earth orbit to study the payload's exposure to the environment and to retrieve the payload from its low earth orbit.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a test platform apparatus to test materials in a space setting. The test platform apparatus may include a lower member, an upper member, a plurality of rear support members, a plurality of medial support members, a plurality of front support members, and a plurality of side members. The apparatus may also include a plurality of attachment members, a plurality of mounting members, and a plurality of heatsinks. The rear support members may be positioned to extend between the upper and the lower member. The medial support members may be positioned to extend between the upper and lower member. The side members may be positioned to extend between the upper member and the lower member. The attachment members may be carried by an external surface of the lower member and the attachment members may be configured to connect to a portion of an external platform. The mounting members may be carried by an internal surface of the lower member and/or the side members. The heatsinks may be connected to the internal surface of the lower member. The lower member may have more than one heatsink receiving holes formed in it. The heat sink receiving holes may be adapted to receive portions of the heatsinks to connect the heatsinks to the internal surface of the lower member. The heatsinks may be configurable and moveable on the internal surface of the bottom member.

The rear support members, medial support members, and front support members may have a groove formed into them. The side members may have side portions that are configured to fit within the grooves so that the side members insert into the groove formed in the rear support members, the medial support members, and the front support members.

The side members may include a front side panel, a lower rear side panel, and/or an upper rear side panel. The front support members may include a pair of front corner support members and at least one front medial support member. The front support members may further include a front plate member that engages the front corner support members and the front medial support members.

The apparatus may further include a material tester. The material tester may be configured to connect to the mounting members. The material tester may, for example, be a square material tester, a bonded material tester, and an organic and ceramic material tester.

The front plate member may include a composite material tester. The apparatus may still further include a power supply and a power distribution board that is in connection with the power supply. The apparatus may also include a communication system that is connected to the power distribution board. The communication system may include a wireless transceiver device, a data transfer device, and a data storage device.

The apparatus may also include a sensor system and a sensor system connector member. The sensor system connector member may be connected to and extend outwardly from one of the side members or the lower member. The sensor system may be carried by the sensor system connector member and be positioned in communication with the power distribution board and the communication system.

The sensor system may include a sensor bracket, an upper sensor, and a lower sensor. The sensor bracket may be connected to the sensor system connector member. The upper sensor may be connected to an upper portion of the sensor bracket. The lower sensor may be connected to a lower portion of the sensor bracket.

The apparatus may further include a flight computer that may be in communication with the communication system and connected to the power distribution board. The apparatus may also include at least one camera that may be in communication with the communication system and connected to the power distribution board. The apparatus may further include a global positioning satellite (GPS) device that may be in communication with the communication system and connected to the power distribution board.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides a test platform apparatus 10 that is highly configurable for housing a variety materials and technologies in the vacuum of space for monitoring and testing the effects of the exposure of the materials and technology to the harsh environment of space and low earth orbit.

Figure 1:
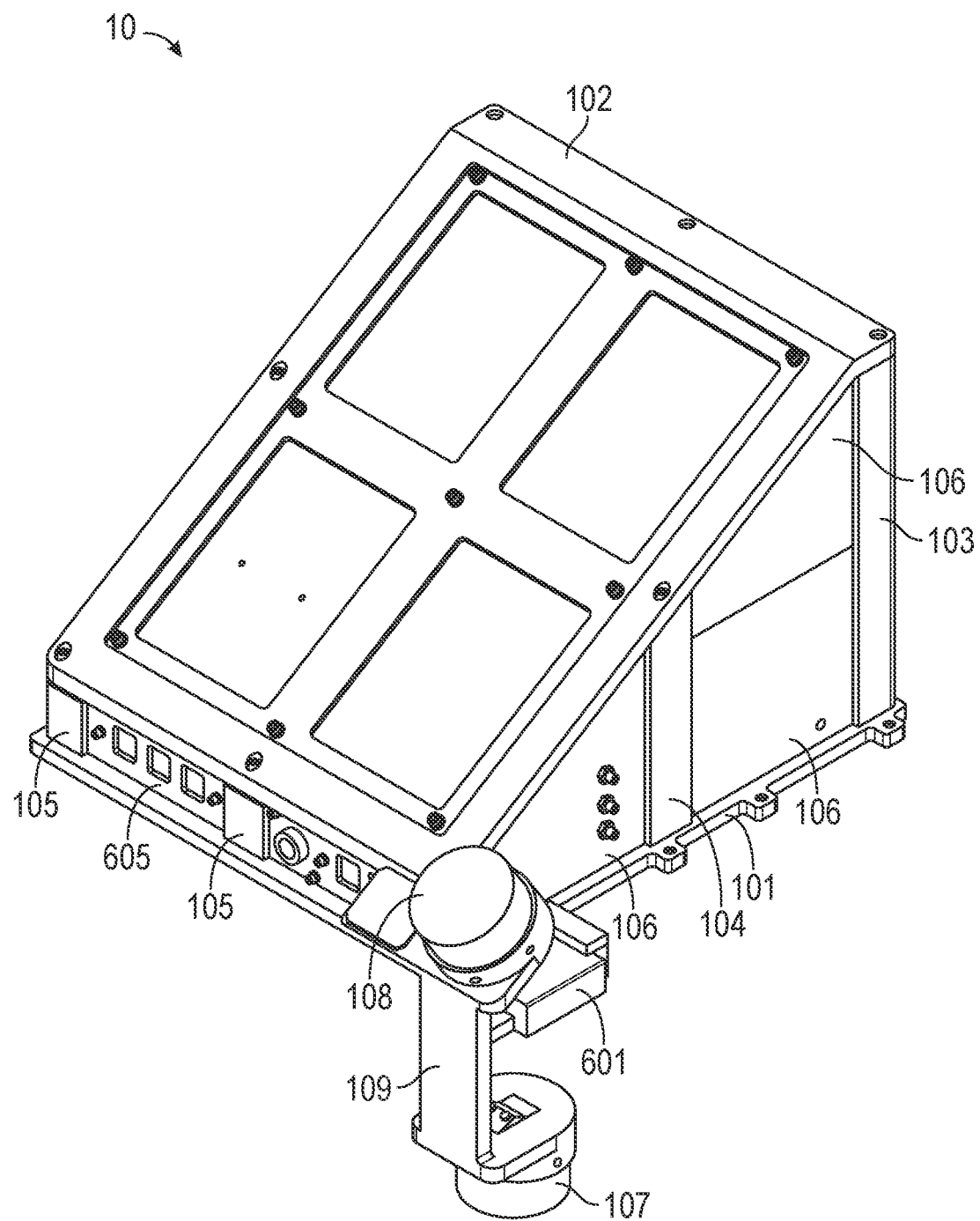
FIG. 1 is perspective view of a test platform apparatus according to an embodiment of the present invention.
Figure 2:
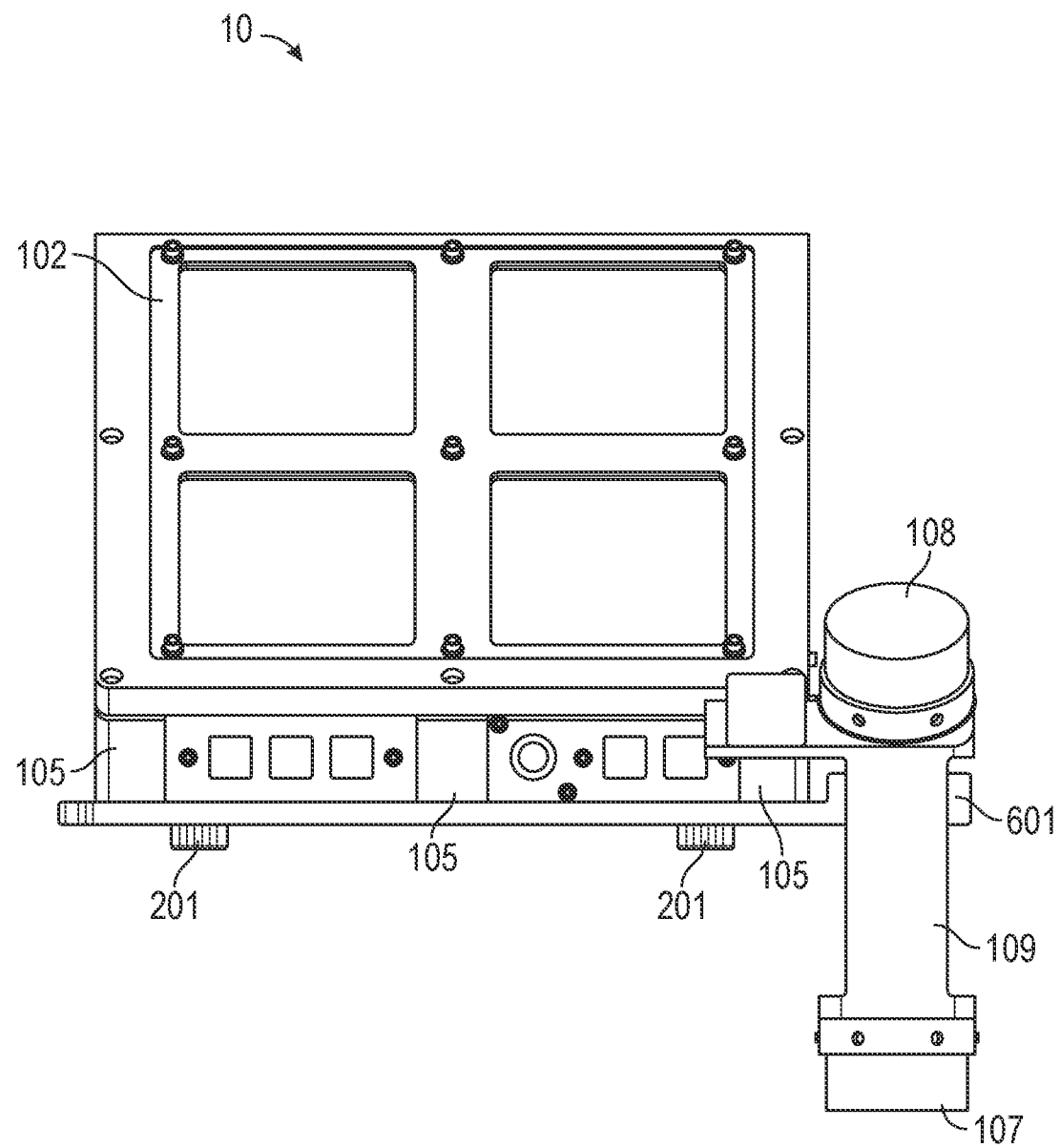
FIG. 2 is a front elevation view of the test platform apparatus illustrated in FIG. 1.
Figure 3:
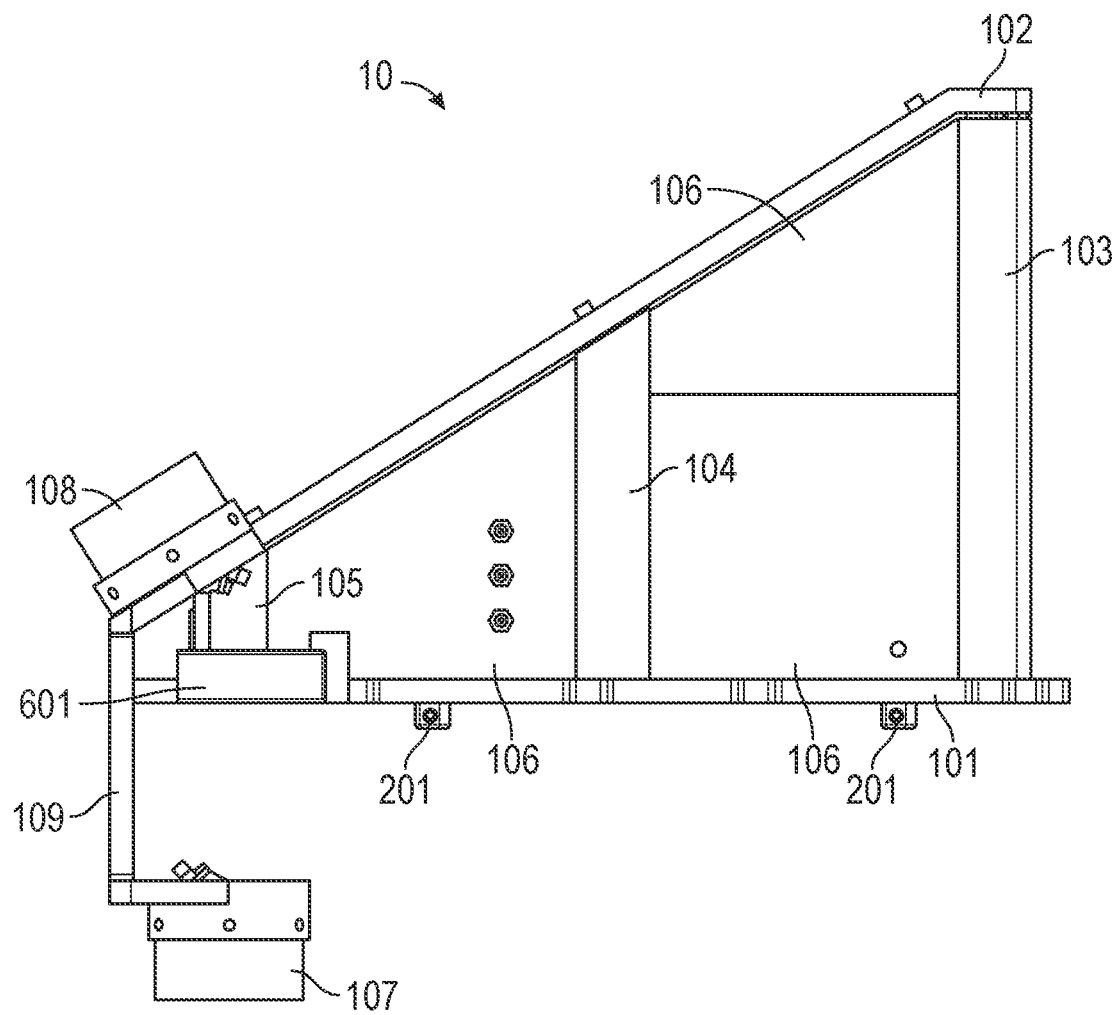
FIG. 3 is a side elevation view of the test platform apparatus illustrated in FIG. 1.

Referring now to FIG. 1, a test platform apparatus 10 according to an embodiment of the invention is presented. The apparatus 10 may comprise of a lower member 101, an upper member 102, a plurality of rear support members 103, a plurality of medial support members 104, and a plurality of front support members 105. The upper support member 102 may be positioned above the lower member 101 at an angled orientation. More specifically, the upper member 102 may be positioned with respect to the lower member 101 at a sloped gradient. The rear support members 103 may be positioned and affixed to extend between the upper member 102 and the lower member 101. More particularly, the rear support members 103 extend between a rear portion of the lower member 101 and a rear portion of the upper member 102. At the rear portions of the lower member 101 and the upper member 102, the distance therebetween is greater than the distance between the upper member and the lower member along the front portions thereof due to the sloped gradient of position of the upper member with respect to the lower member. The front support members 105 may be positioned and affixed extending between the front portions of the upper member 102 and the front portions of lower member 101 where the distance gradient is low.

The medial support member 104 may be positioned and affixed to extend between the upper member 102 and the lower member 101 between the rear support members 103 and the front support members 105. Those skilled in the art will appreciate that the upper member 102 and the lower member 101 may be positioned relative to each other in a variety of different orientations such as, without limitation, at a gradient of distance or parallel at an equal distance at all points between the upper member 102 and the lower member 101 while still accomplishing all the goals, features, and advantages of the present invention. Alternatively, the gradient between the upper member 102 and the lower member 101 may be reversed from that which is illustrated in the appended drawings, i.e., the distance between the upper member and the lower member is less along the rear portion thereof and greater along the front portion thereof.

The rear support members 103, the front support members 105, and the medial support members 104 may be affixed to the upper member 102 and the lower member 101. This may be accomplished using fasteners, adhesives, cements, screws, bolts, and/or any other option to affix the rear support members 103, the front support members 105, the medial support members 104, the upper member 102, and the lower member 101 as understood by those skilled in the art.

Continuing to refer to FIG. 1, the apparatus 10 may include a plurality of side members 106. Each of the plurality of side members 106 may have a different shape. For example, and as illustrated in FIG. 1, a lower one of the side members 106 positioned adjacent a rear portion of the apparatus 10 may have a rectangular shape. Further, additional side members 106 may be included that have polygonal and/or triangular shapes, as illustrated. Those skilled in the art will appreciate that the shapes of the side members may be any shape, such as, without limitation, a rectangle, square, triangle, or trapezoid. The side members 106 of the apparatus 10 may comprise of at least one front side panel, at least one lower rear side panel, and at least one upper rear side panel. Those skilled in the art will also appreciate that any number of side members 106 having any type of shape.

The upper member 102, the lower member 101, the rear support members 103, the front support members 105, and the medial support members 104 may include grooves formed therein that are configured so that the plurality of side members 106 may matingly engage the grooves in the upper member 102, the lower member 101, the rear support members 103, the front support members 105, and the medial support members 104. The side members 106 may be attached to the upper member 102, the lower member 101, the rear support members 103, the front support members 105, and the medial support members 104 by fasteners, adhesives, cements, screws, bolts, and/or any other form of attachment as understood by those skilled in the art.

Referring now to FIGS. 2-3 and 12-13, the lower member 101 may include a sensor system connector member 601 that may be affixed to the lower member 101. Alternatively, the sensor system connector member 601 may be a part of the lower member 101 so that the lower member and the sensor system connector member are formed a single monolithic unit. The sensor system connector member 601 may alternatively be attached to the side members 106, the front support members 105, the medial support members 104, the rear support members 103, and/or the upper member 102. In an alternative embodiment, the sensor system connector member 601 may be formed as a monolithic unit with the side members 106, the front support members 105, the medial support members 104, the rear support members 103, and/or the upper member 102. The sensor system connector member 601 may be configured to carry a sensor system 1604. The sensor system 1604 may include a sensor bracket 109 that may be adapted to be fixed to the sensor system connector member 601 and may carry a lower sensor 107 and an upper sensor 108. More details on the sensor system 1604 follows further below.

Figure 4:
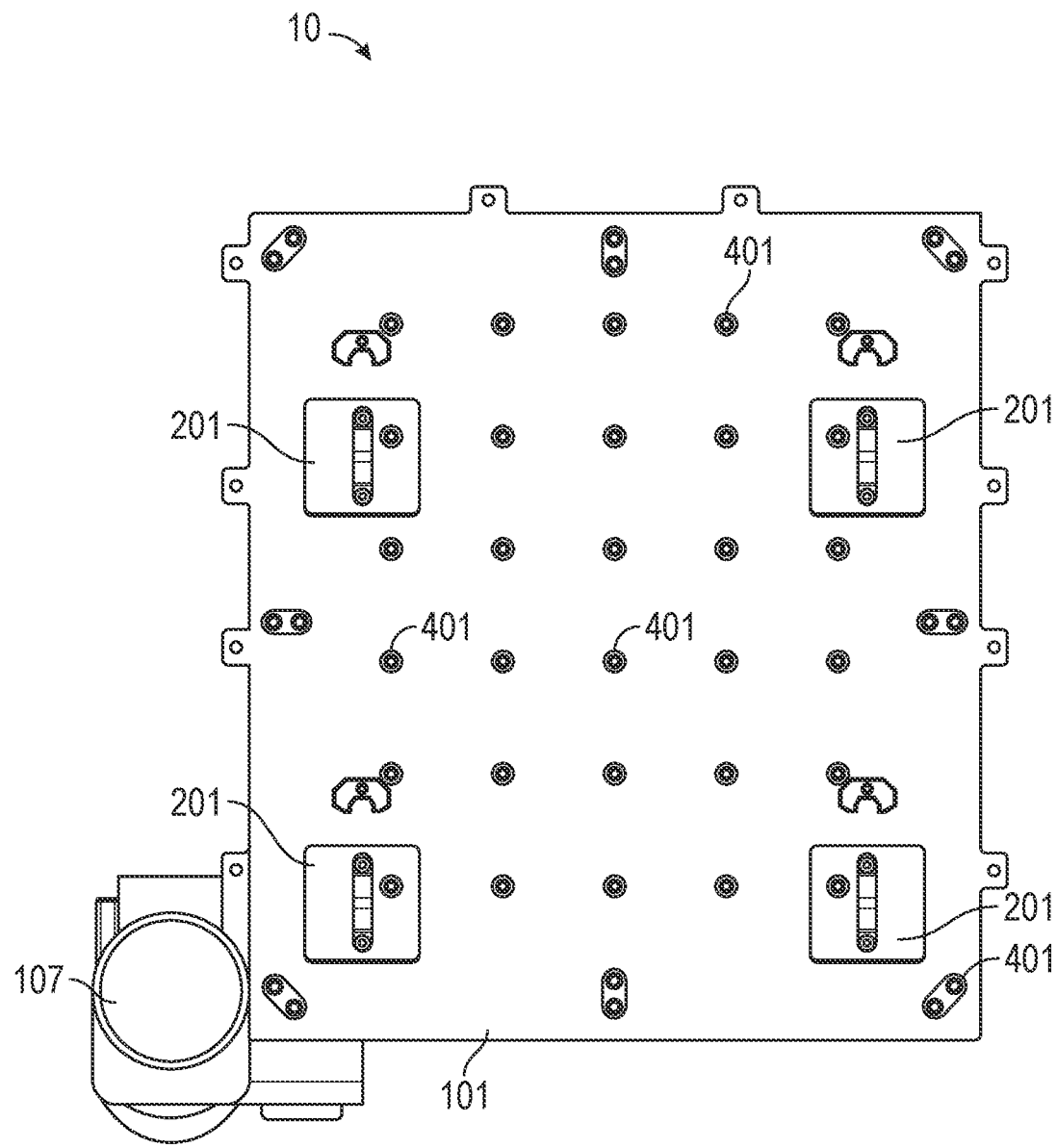
FIG. 4 is a bottom plan view of the test platform apparatus illustrated in FIG. 1.
Figure 5:
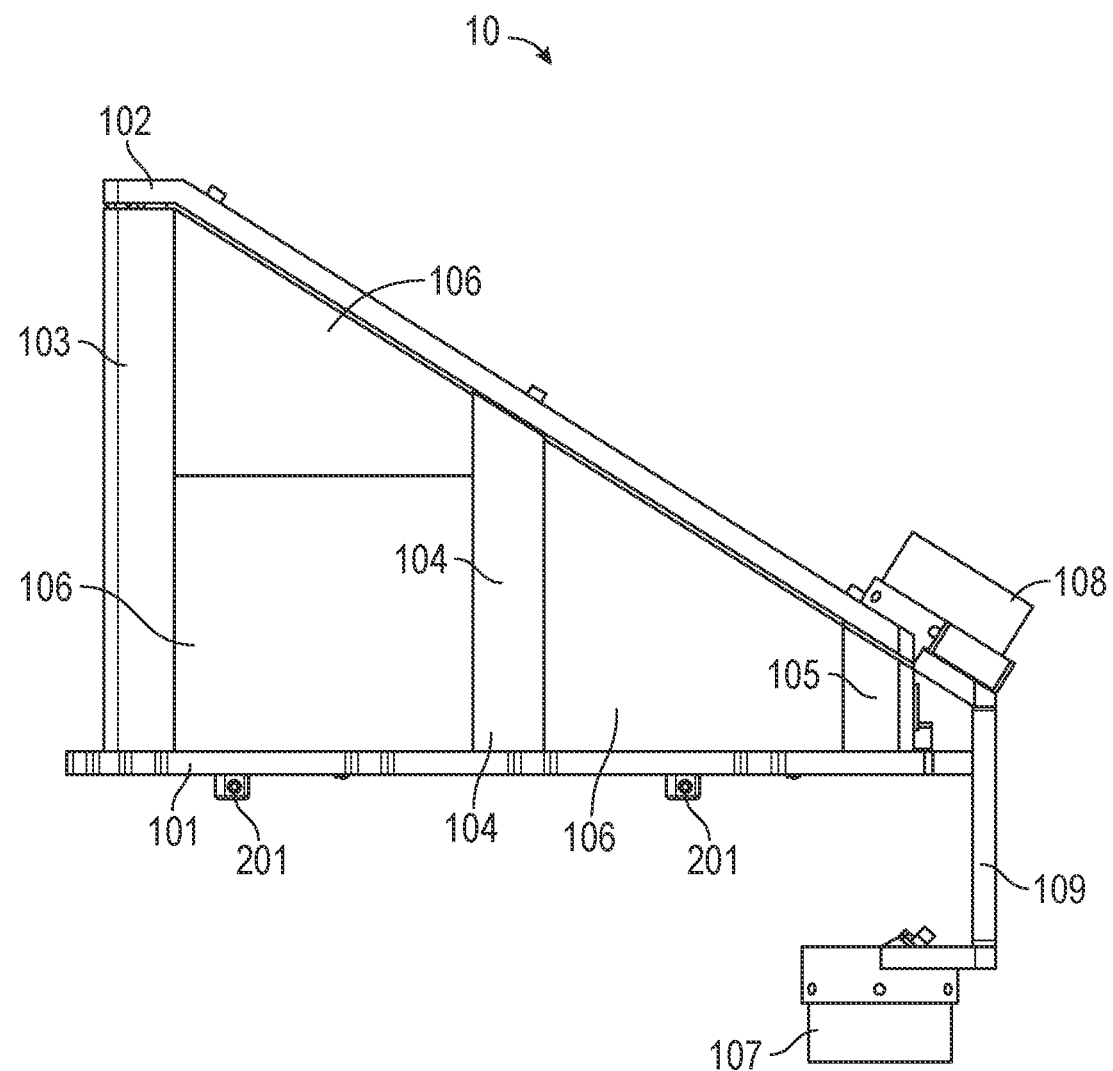
FIG. 5 is another side elevation view of the test platform apparatus illustrated in FIG. 1.
Figure 15:
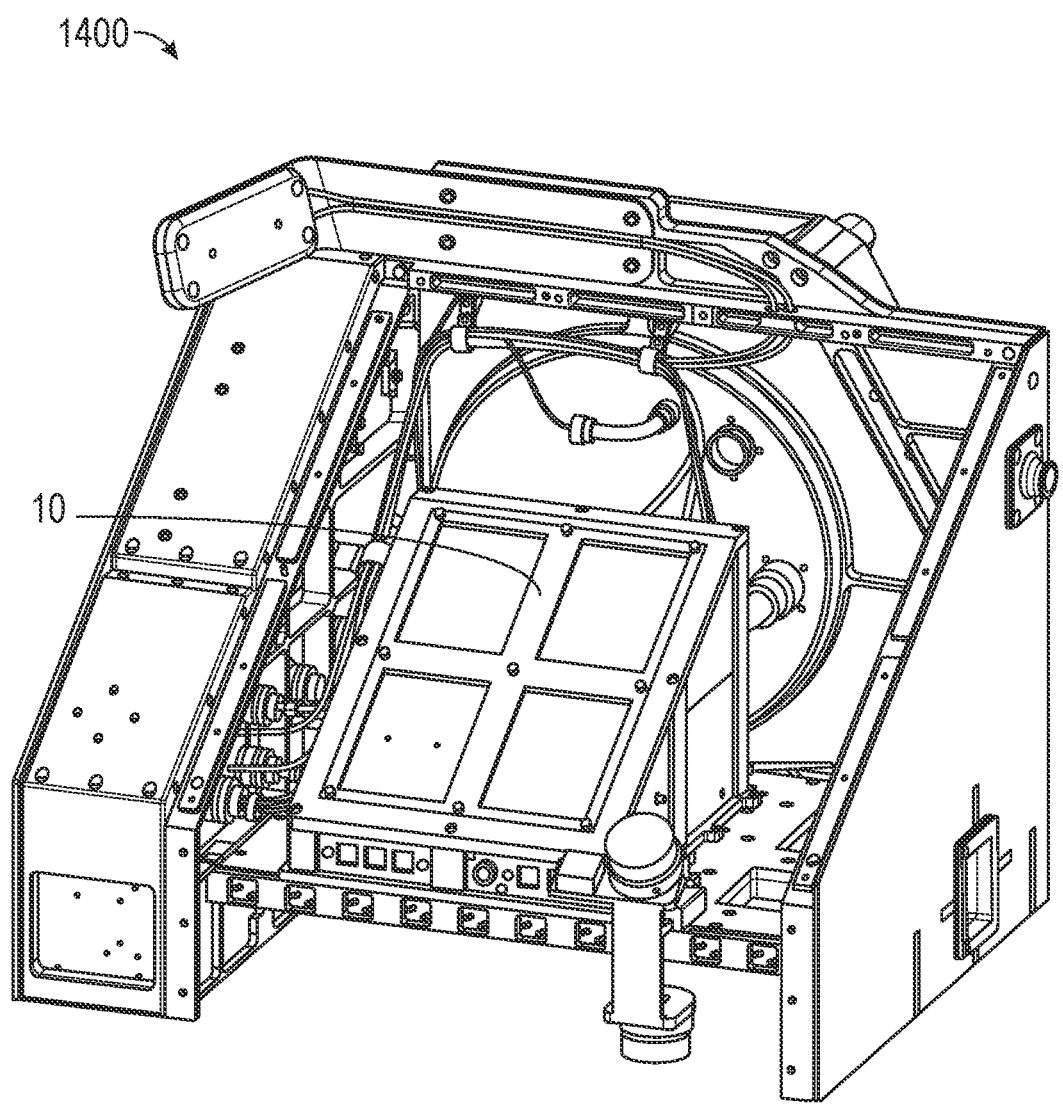
FIG. 15 is a perspective view of internal portions of the test platform apparatus illustrated in FIG. 14.

Referring now to FIGS. 4 and 15, the lower member 101 may include a number of attachment members 201 and/or a plurality of heatsink receiving holes 401. The attachment members 201 may be attached to a lower face of the lower member 101 and may be configured to be grasped, attached, or fixed to an external platform 1400 to connect the apparatus 10 to the external platform 1400. The configuration of the heatsink receiving holes 401 advantageously allows for the attachment members 201 to be positioned on the lower member 101 in any number of configurations.

The external platform 1400 may include a mounting rail or plate having a series of blind mate connectors and attachment mechanisms that may include, without limitation, pins, latches, or grapples to matingly engage the attachment members 201 to connect the attachment members 201 to the external platform 1400. Placement of the apparatus onto the external platform 1400 by a mechanical robotic arm (not shown).

The plurality of heatsink receiving holes 401 may be positioned throughout the lower member 101 and each heatsink receiving hole 401 may extend through the thickness of the lower member. Alternatively, each of the heatsink receiving holes 401 may extend less than all the way through the lower member 101. More details on the heatsink receiving holes 401 are provided below.

Figure 11:
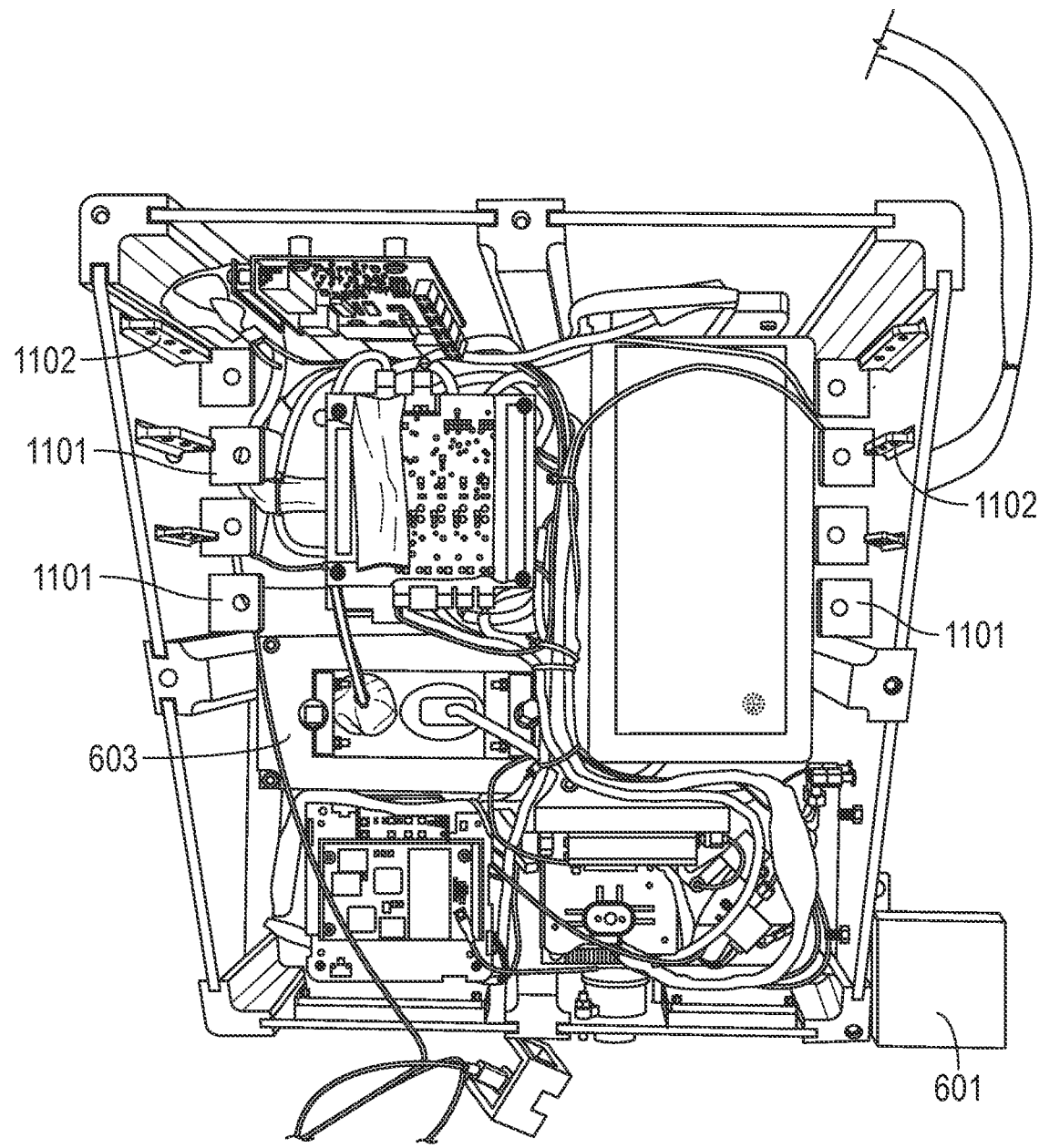
FIG. 11 is a top perspective view of a plurality of lower mounting members and a plurality of upper mounting members of the test platform apparatus according to an embodiment of the present invention.

Referring now to FIG. 11, the apparatus 10 may include a number of mounting members that may include lower mounting members 1101 and upper mounting members 1102. The lower mounting members 1101 and the upper mounting members 1102 may be attached to an inside face of at least one of the side members 106, the rear support members 103, the medial support members 104, the front support members 105, the upper member 102, and/or the lower member 101. The lower mounting members 1101 and the upper mounting members 1102 may be attached by fasteners, adhesives, welding, and/or any other way of attachment as understood by those skilled in the art. The lower mounting members 1101 and the upper mounting members 1102 configured to receive objects to be exposed to the vacuum of space. More details on the upper mounting members 1102 and the lower mounting members 1101 are provided below.

Continuing to reference to FIG. 11, and referring additionally to FIGS. 6-10, the apparatus 10 may include material testers that may comprise of one or more of a square material tester 602, an organic and ceramic material tester 603, and a bonded material tester 604. The upper mounting members 1102 and the lower mounting members 1101 may be configured to be connected to the square material testers 602, the organic and ceramic material testers 603, and the bonded material testers 604 by at least one of bolts, screws, nails, clips, and any other type of connection as understood by those skilled in the art.

The square material tester 602 may include a material tester front plate 701 and a material tester back plate 702. The material tester back plate 702 may include a plurality of payload recesses 703 that are placed throughout a face of the material tester back plate 702. The payload recesses 703 may be configured to be square in shape, however, those skilled in the art will notice and appreciate that the payload recesses 703 may be provided using a number of different shapes while still accomplishing the goals, features, and advantages of the present invention. The material tester front plate 701 may include a plurality of payload through holes 704 that may be configured to align with the payload recesses 703 on the material tester back plate 702 when a front face of the material tester back plate 702 is connected to a back face of the material tester front plate 701. The square material tester 602 may be configured to carry a number of different payloads (not shown) by inserting the payloads into one of the plurality of payload recesses 703 in the material tester back plate 702 and attaching the material tester front plate 701 to the material tester back plate 702. The payloads may be a variety of different materials and/or technology, and the payloads may be in the same shape as the payload recesses 703, such as, without limitation, in the shape of squares.

The organic and ceramic material tester 603 may be configured to carry and house payloads made of ceramics and/or organic materials to test the reaction of the ceramic and/or organic material being exposed to the vacuum of space. The bonded material tester 604 may be configured to carry payloads of materials that are bonded together in order to test the bond's reaction to exposure to the harsh environment of low earth orbit.

Figure 6:
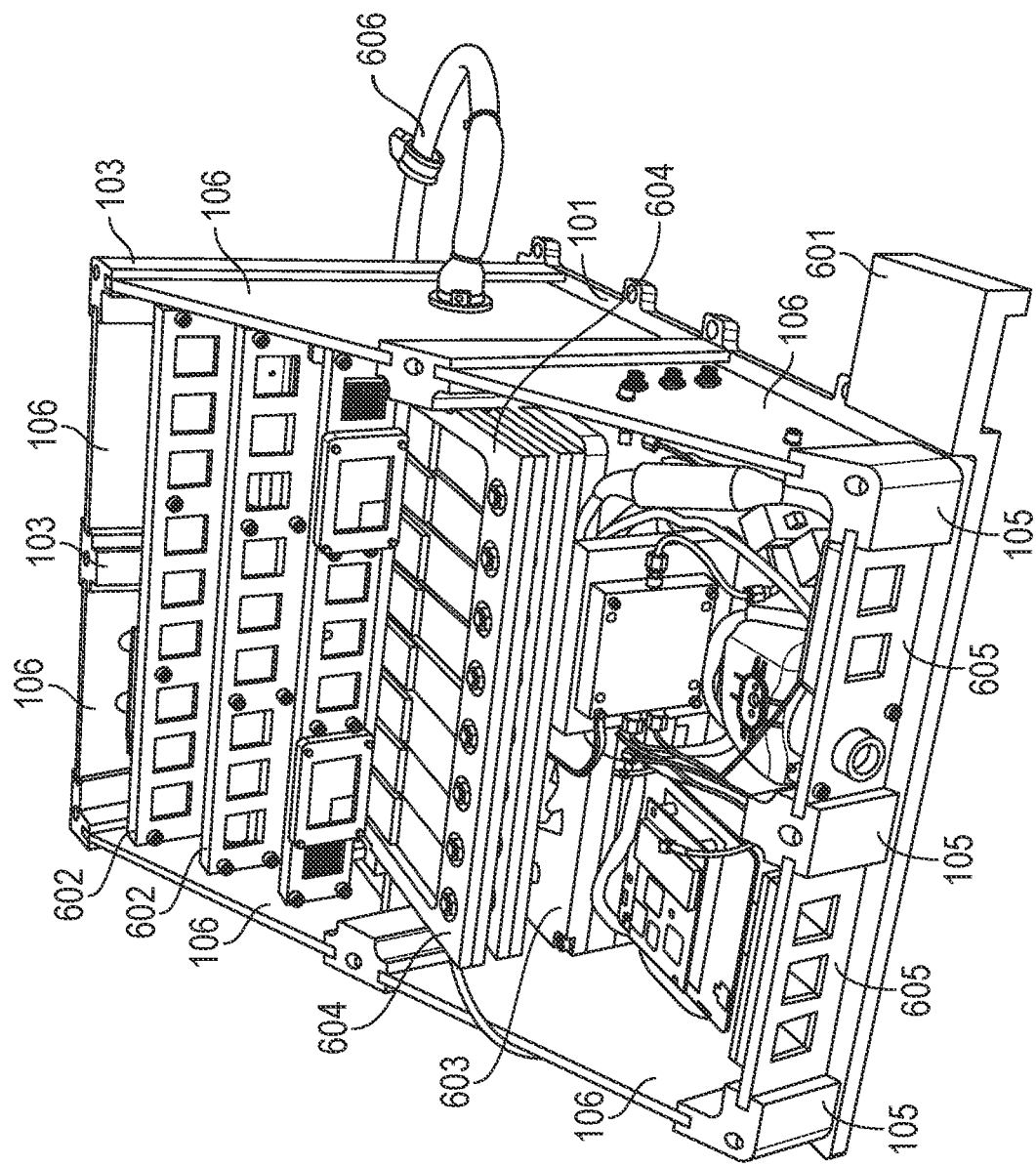
FIG. 6 is a perspective view of the test platform apparatus according to an embodiment of the present invention having an upper member removed to show an inside portion thereof.
Figure 7A:
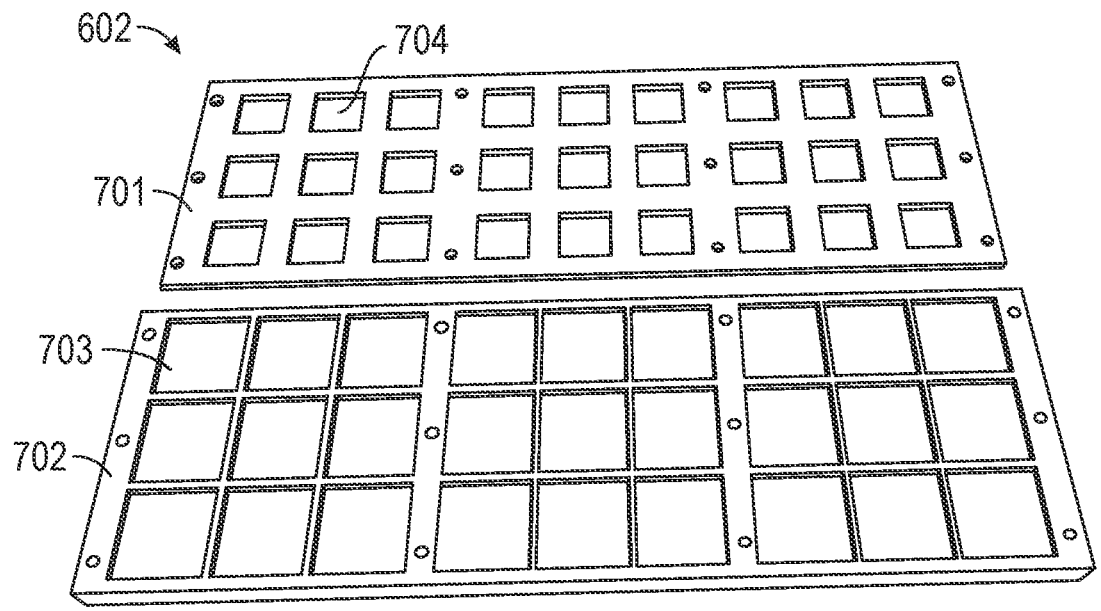
FIG. 7A is a perspective view of a material tester front plate and a material tester back plate of the test platform apparatus according to an embodiment of the present invention.
Figure 7B:
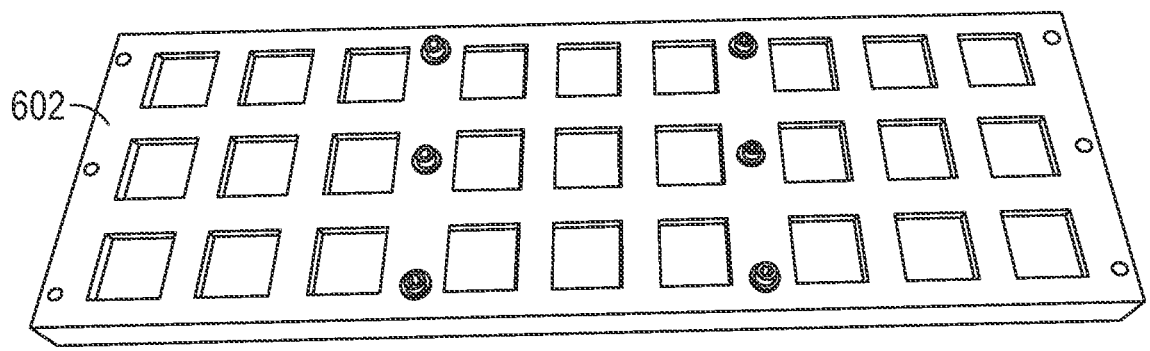
FIG. 7B is another perspective view of the material tester front plate and the material tester back plate illustrated in FIG. 7A connected together to form a square material tester.
Figure 8:
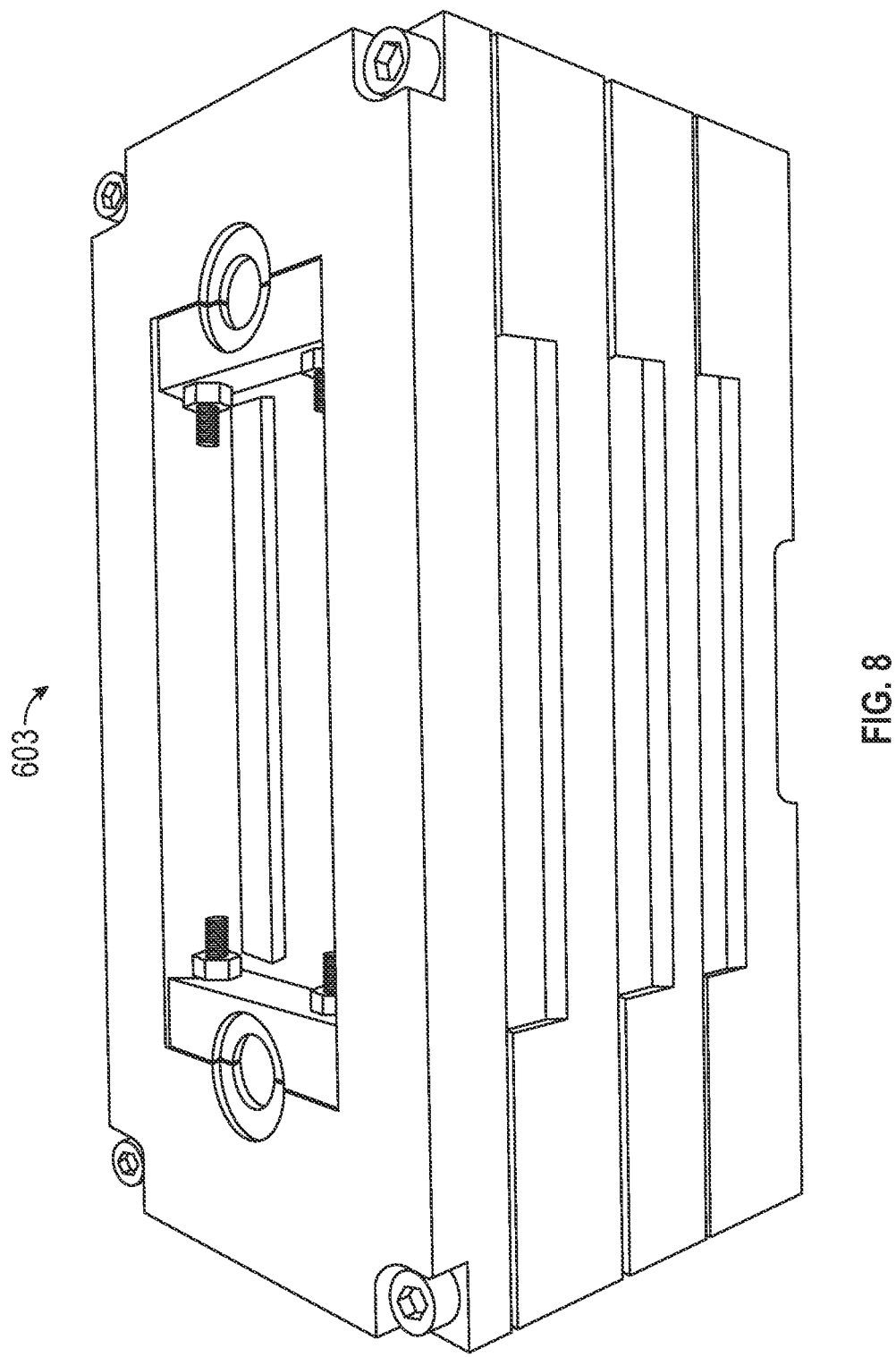
FIG. 8 is a perspective view of an organic and ceramic material tester of the test platform apparatus according to an embodiment of the present invention.
Figure 9:
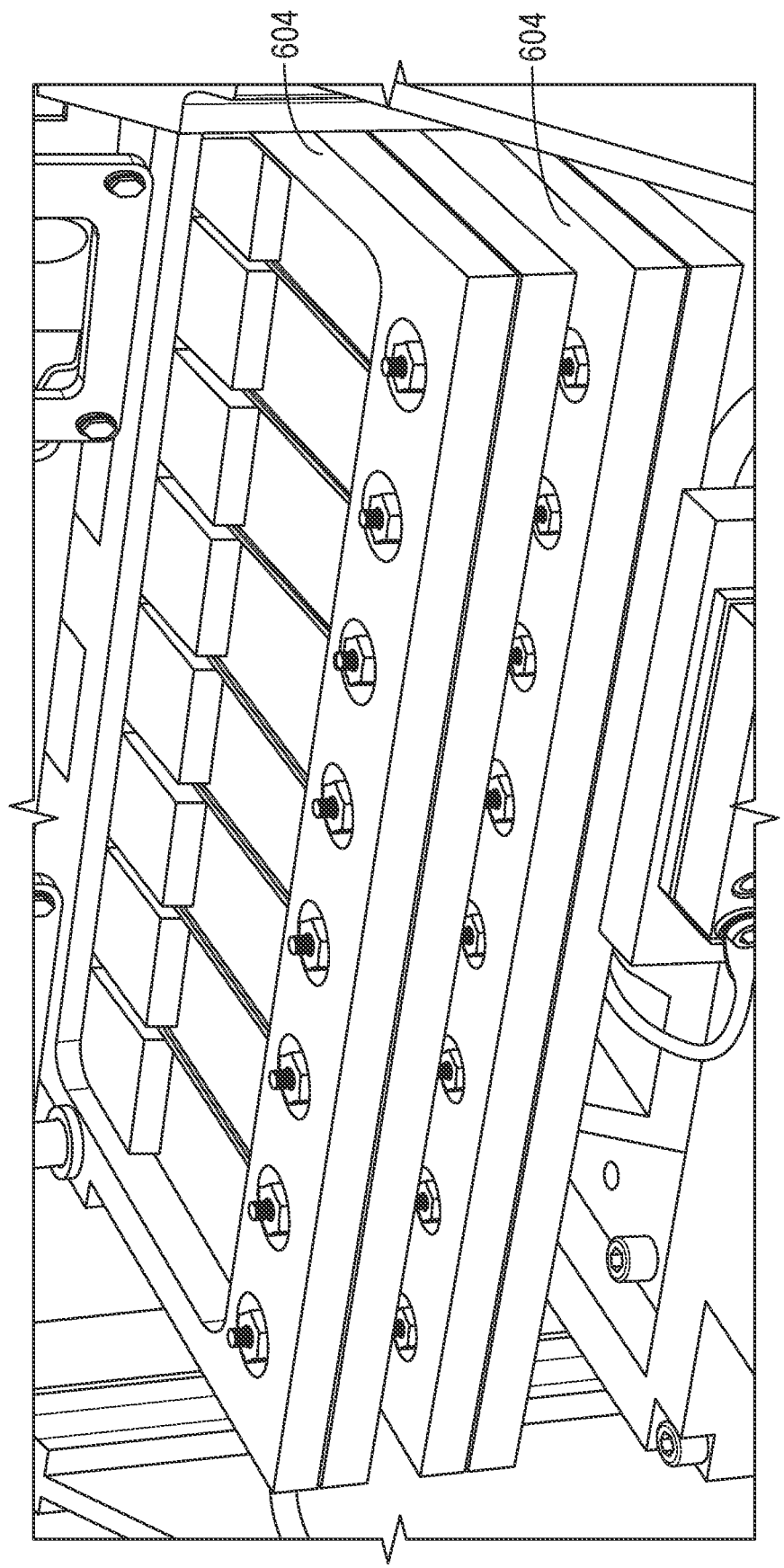
FIG. 9 is a perspective view of a pair of bonded material testers of the test platform apparatus according to an embodiment of the present invention and having portions cut away.
Figure 10:
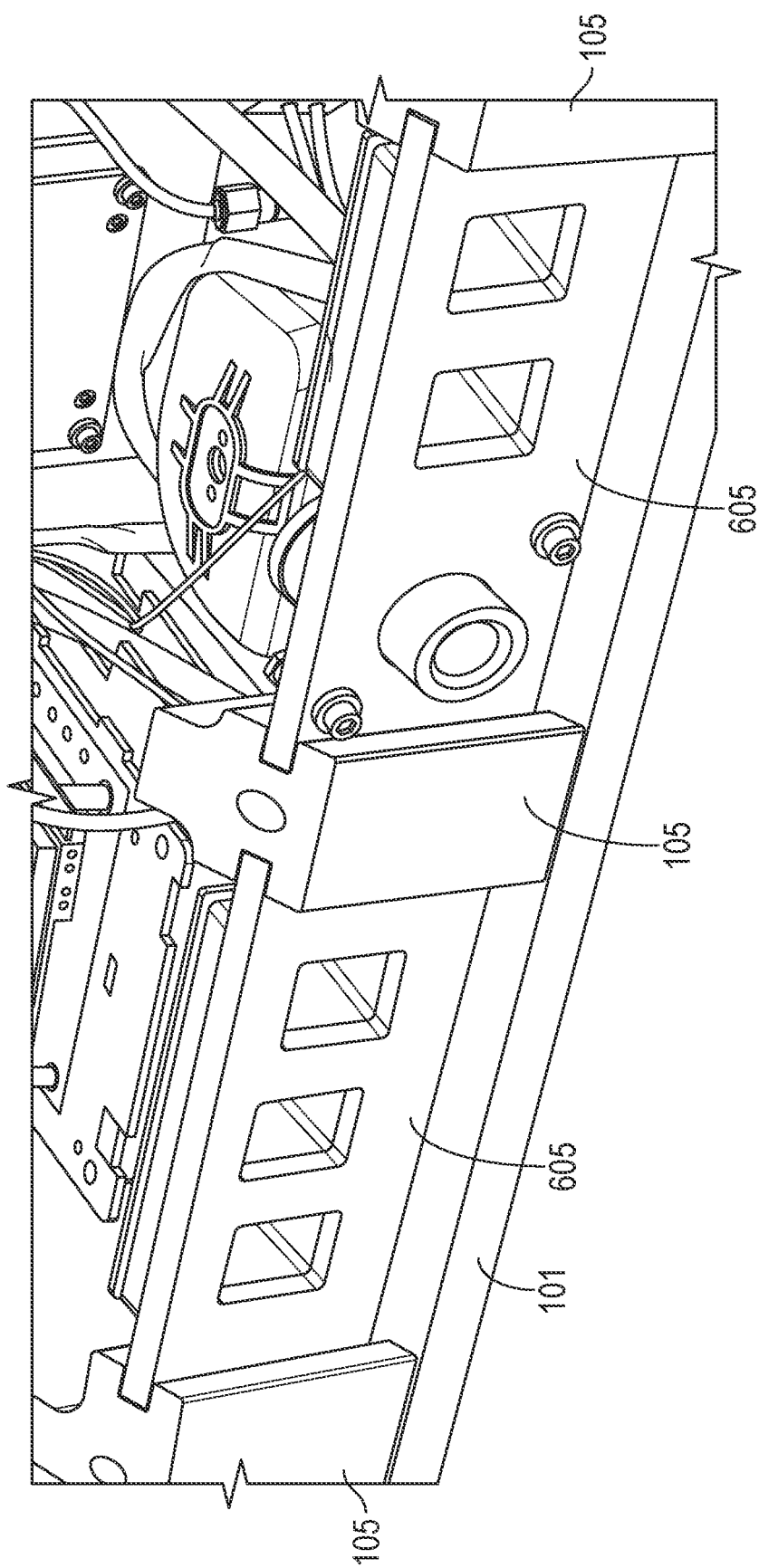
FIG. 10 is a perspective view of composite material testers of the test platform apparatus according to an embodiment of the present invention and having portions cut away.

As perhaps best illustrated in FIGS. 1 and 6, the apparatus 10 may include a number of front plate members 605 which may be used as composite material testers. The front plate members 605 may be configured to be matingly engaged with the grooves in the front support members 105. The front plate members 605 may also be configured to carry and house composite materials as payloads in order to test a reaction of the materials to being exposed to the vacuum and harsh conditions of space.

Figure 16:
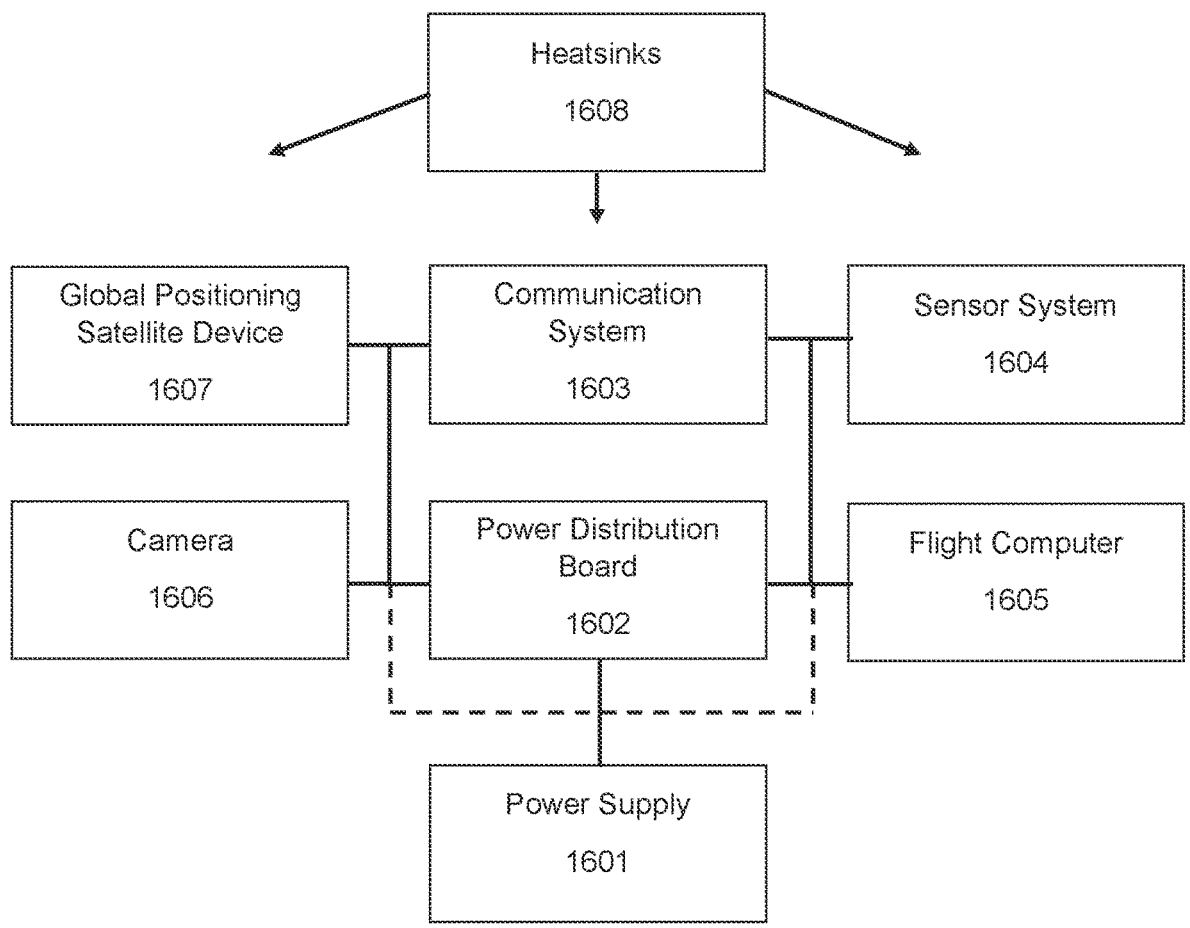
FIG. 16 is a schematic box diagram of electronic components of the test platform apparatus according to an embodiment of the present invention.

Referring now to FIG. 16, the schematic box diagram showing additional features of the apparatus 10 is now described in greater detail. The apparatus 10 may include a power supply 1601, a power distribution board 1602, a flight computer 1605, a communication system 1603, a global positioning satellite device 1607, a camera 1606, and one or more heatsinks 1608. These components, along with the sensor system 1604, may be referred to herein separately or may be collectively (or any number of components in combination) may be referred to as electronic components of the apparatus 10 according to the present invention.

Figure 18:
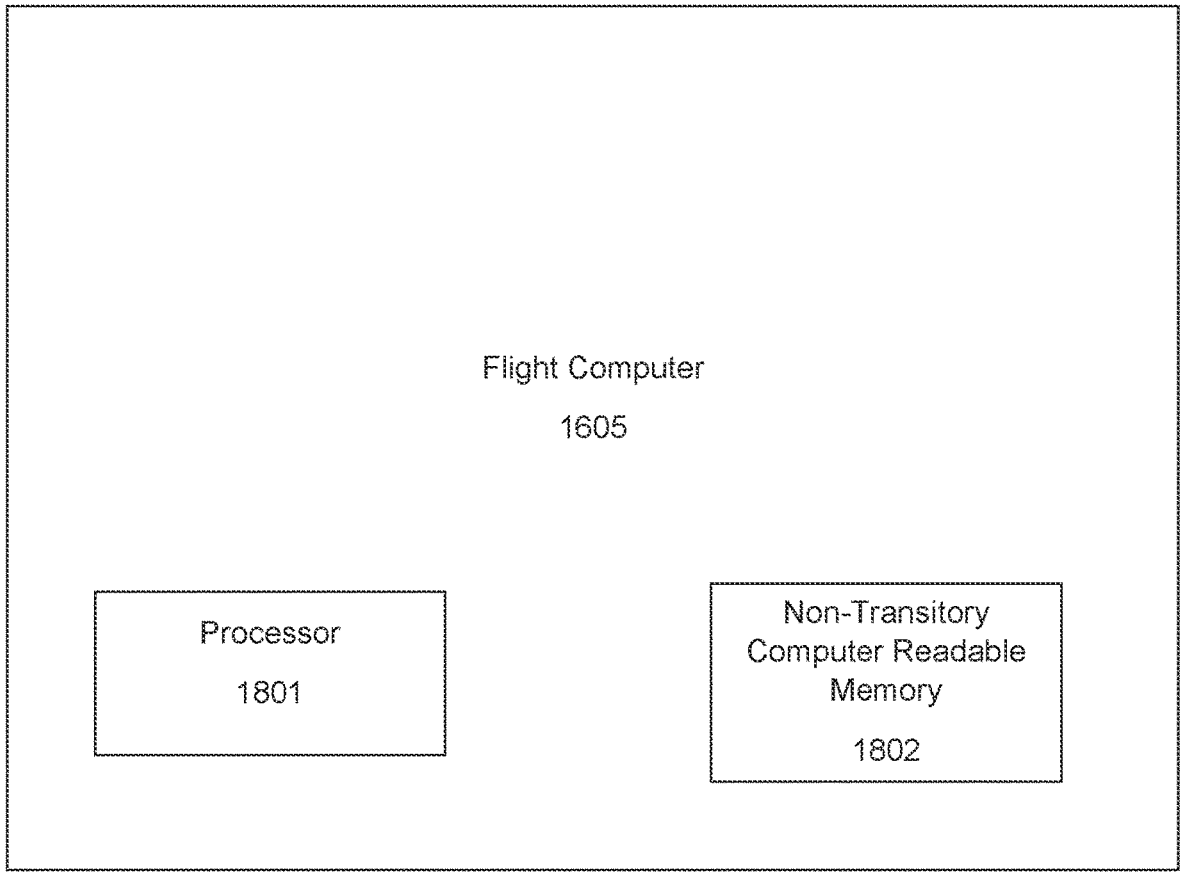
FIG. 18 is a schematic box diagram of a flight computer of the test platform apparatus according to an embodiment of the present invention.

Referring now specifically to FIG. 18, additional details of the flight computer 1605 are now provided. The flight computer 1605 may be positioned in communication with the electronic components of the apparatus 10 to monitor and control the activities and actions of the electronic components. The flight computer 1605 may include a processor 1801 and a non-transitory computer readable memory 1802, for example, as illustratively shown in FIG. 18. The processor 1801 may be configured to read, compute, and execute computer readable instructions and code. The non-transitory computer readable memory 1802 may be configured to receive, store, and/or send computer readable instructions and code to and from the electronic components of the apparatus 10.

The power supply 1601 may be connected to the electronic components of the apparatus 10 to supply electrical power thereto. The power supply 1601 may include a battery or power generator to store or generate electrical power for the electronic components. The power supply 1601 may also obtain its electric power from an external power source (not shown) through a power line 606, as illustratively shown, for example, in FIG. 6. The external power source may be from, without limitation, a space station, satellite, or an external platform to which the apparatus 10 may be connected. The power distribution board 1602 may be connected to the electronic components of the apparatus 10 to control, monitor, and/or direct the electrical power supplied by the power supply 1601 to the electronic components and the power consumed by the electronic components. In an alternative embodiment, solar panels (not shown) may be provided on an exterior portion of the apparatus 10 and may be positioned in communication with the power supply 1601 to provide power via the solar panels.

With continued reference to FIG. 16, the camera 1606 may be positioned in communication with the electronic components of the apparatus 10 and may be configured to take photographs or videos of a number of different types and in a number of different directions. There may also be more than one camera 1606 included in the apparatus 10. The camera 1606 may be configured to take photos or videos of different spectrums of light, such as, without limitation, x-ray, infrared, visible light, gamma rays, radar, and/or ultraviolet. The camera 1606 may also be configured to take photos and videos directed outside of the apparatus, or of the components and/or payloads carried by or a part of the apparatus 10. For example, the camera 1606 may, for example, be used to capture a reaction of a material being tested after the material is exposed to the conditions of space. Alternatively, the camera 1606 may be used to provide a view of the interior portions of the apparatus so that such views can be transmitted to a control center, for example, in the event that there is a problem with the apparatus. This advantageously allows for operators to trouble shoot any such problem that may exist using the images and/or video captured by the camera 1606.

Figure 17:
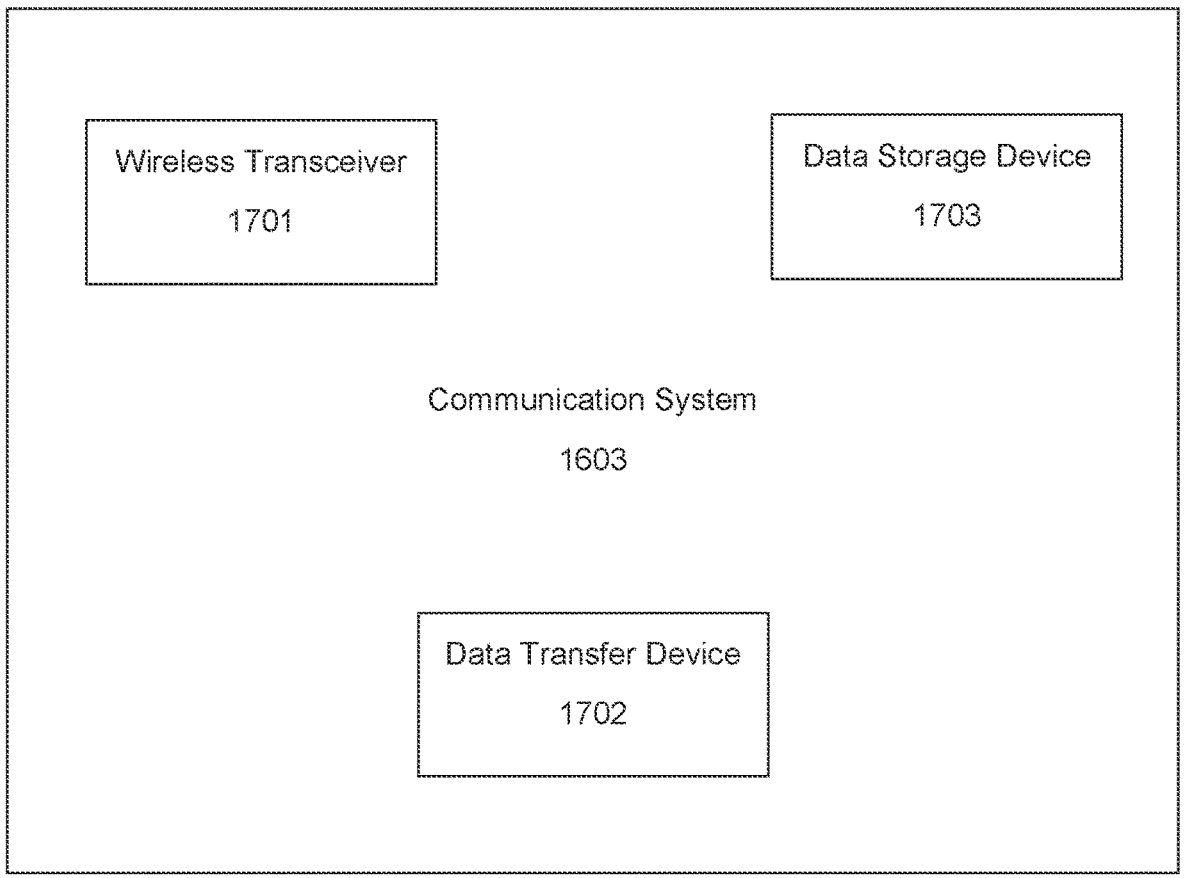
FIG. 17 is a schematic box diagram of a communication system of the test platform apparatus according to an embodiment of the present invention.

As further illustrated in FIG. 6, the communications system 1603 may be positioned in communication with the electronic components of the apparatus 10. The communications system 1603 may include a wireless transceiver 1701, a data storage device 1703, and a data transfer device 1702, for example, as illustratively shown in FIG. 17. The communications system 1603 may be configured to receive, transmit, forward, the data, information, and communications to and from the apparatus 10. The wireless transceiver 1701 may be configured to receive, forward, and send data, information, and communications to and from the apparatus 10. The data storage device 1703 may be configured to store information and computer readable instructions from the electronic components of the apparatus 10, or from communications with the apparatus 10 from a device (not shown) that is in communication with the apparatus 10. The data transfer device 1702 may be configured to facilitate and mediate the data transfer between the electronic components of the apparatus, and the data transfer to and from the apparatus. The communications system 1603 may also be used to transmit images and video captured by the camera 1606.

Figure 12:
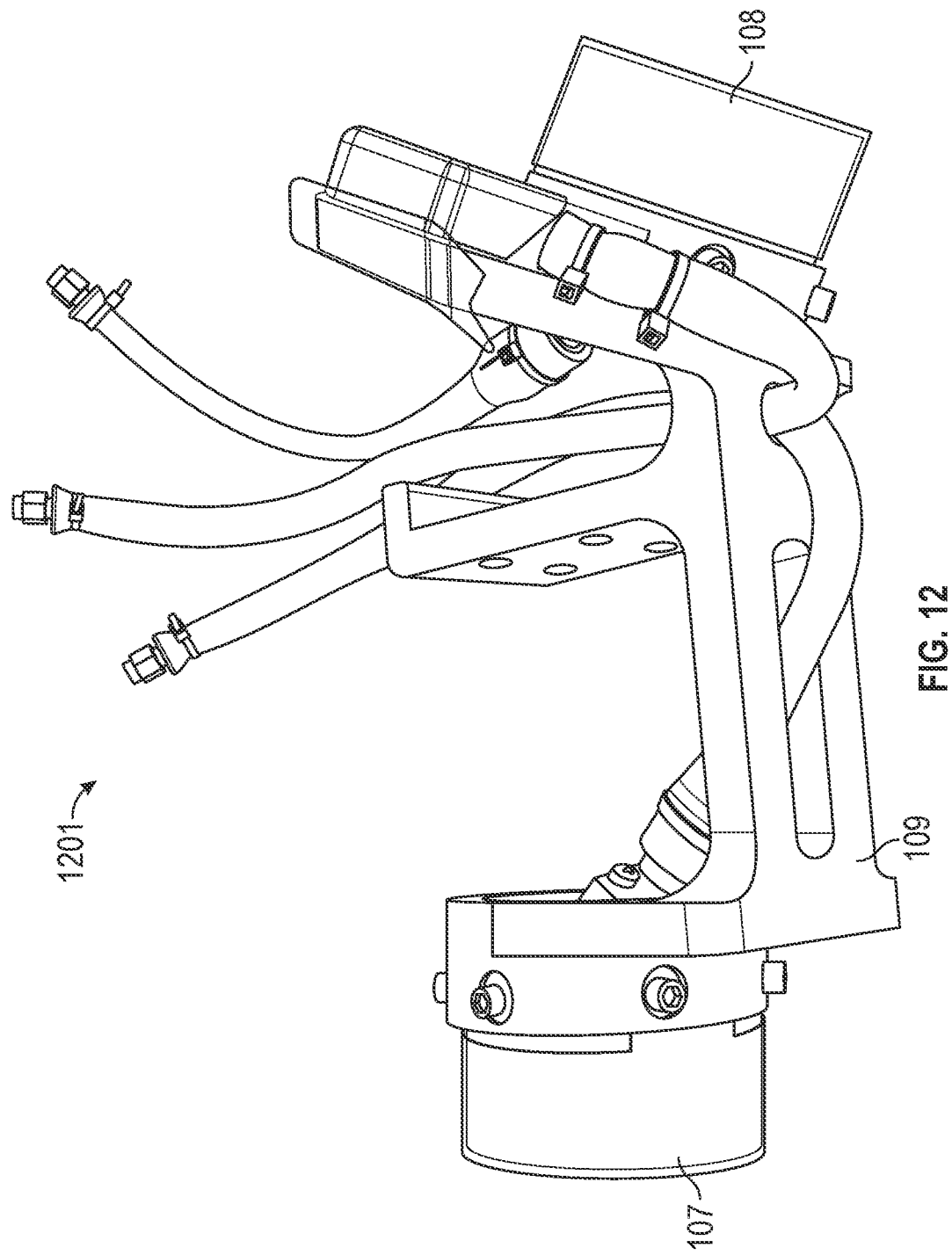
FIG. 12 is a perspective view of a sensor system of the test platform apparatus according to an embodiment of the present invention.
Figure 13:
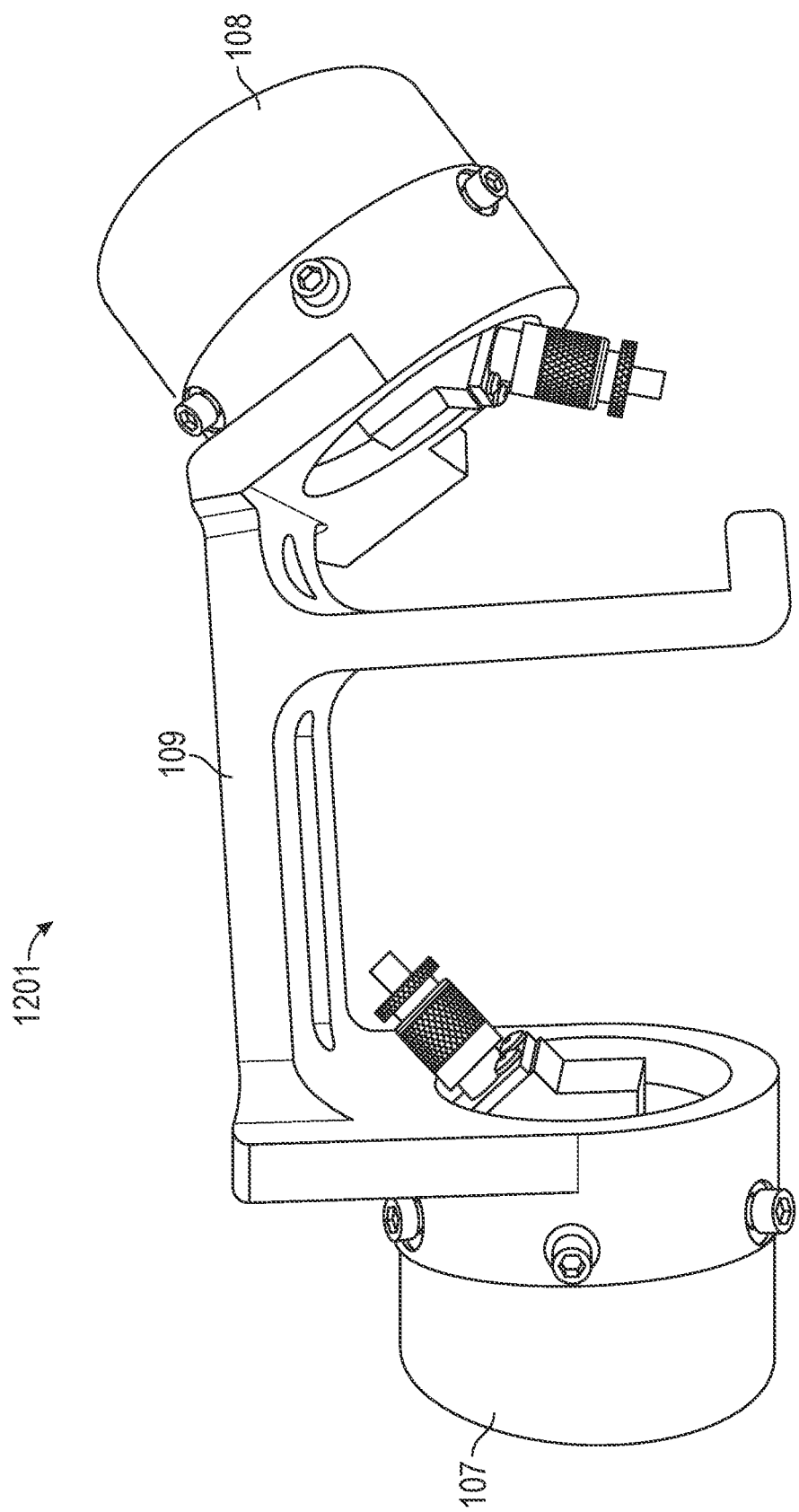
FIG. 13 is another perspective view of the sensor system illustrated in FIG. 12.
Figure 14:
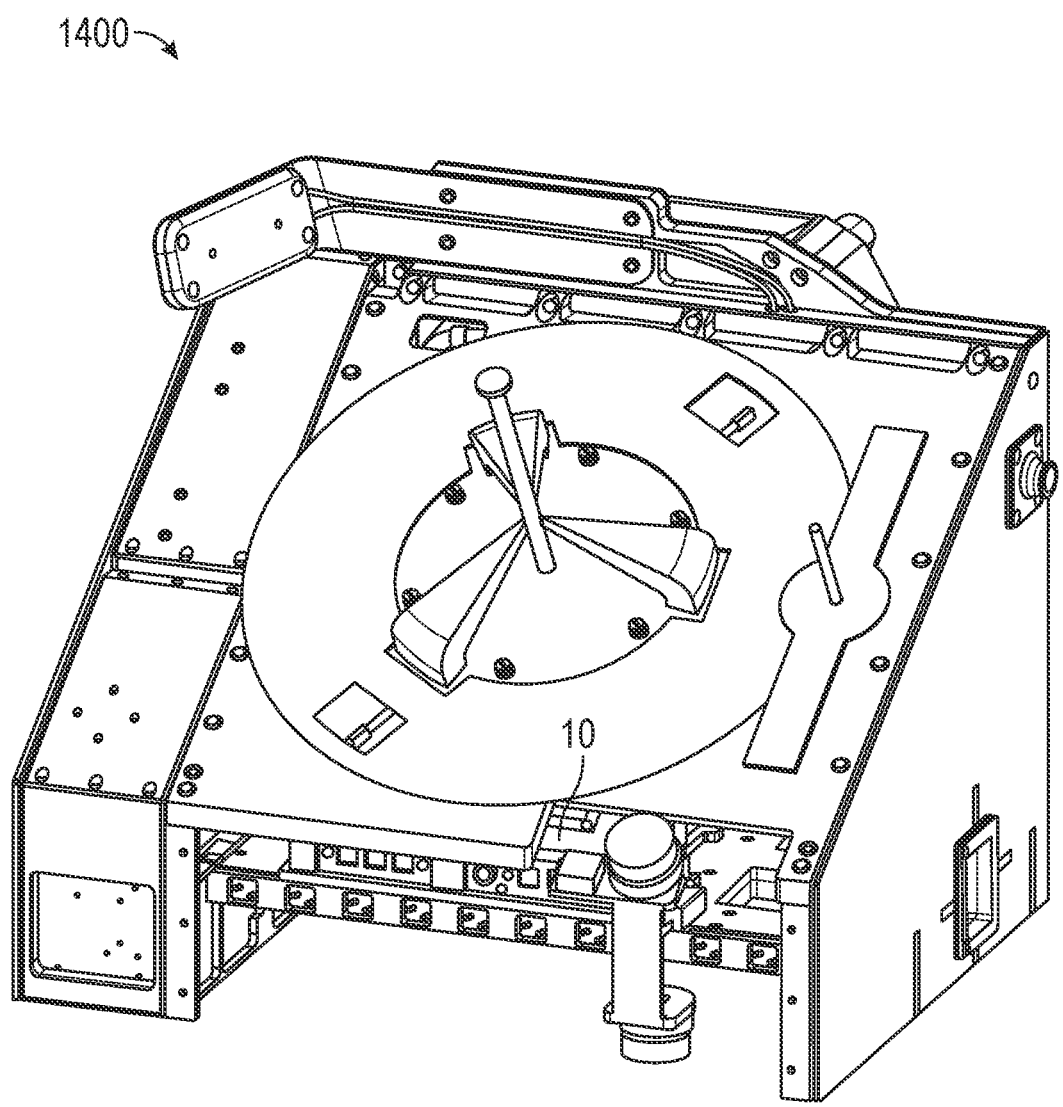
FIG. 14 is a perspective view of internal portions of the test platform apparatus according to an embodiment of the present invention.

Continuing to refer to FIG. 16, and referring additionally to FIGS. 1 and 12, the sensor system 1604 may be positioned in communication with the electronic components of the system to send and receive computer readable data. The computer readable data may be the data created by the upper sensor's 108 and the lower sensor's 107 operations, or the computer readable data may be code and instructions sent to the sensor system 1604 by the electronic components of the apparatus 10 or from other devices (not shown) that are in communication with the apparatus 10. The lower sensor 107 and the upper sensor 108 may include of one or more of a variety of sensors including, but not limited to, active remove sensors and passive remote sensors. More specifically, the upper sensor 108 and the lower sensor 107 may include, without limitation, laser altimeters, light detection and ranging (LiDAR), radio detection and ranging (RADAR), scatterometers, sounder instruments, spectrometers, radiometers, spectroradiometers, imaging radiometers, temperature sensors, and magnetic sensors. Those skilled in the art will notice and appreciate that a variety of instruments can be used as the upper sensor 108 and the lower sensor 107 while still accomplishing all the goals, features, and advantages of the present invention.

Referring specifically to FIG. 16, a global positioning satellite (GPS) device 1607 may be positioned in communication with the electronic components of the apparatus 10.

The GPS device 1607 may be configured to detect and process the location (spatial) of the apparatus 10, and to export the location of the apparatus 10 to other devices (not shown) that are in communication with the apparatus 10. The GPS device 1607 may be also configured to receive instructions and be controlled by the electronic components of the apparatus 10, or by the instructions received by the apparatus from an outside device (not shown) that is in communication with the apparatus 10 via the communication system 1603.

Continuing to refer to FIG. 16, and additionally referring to FIG. 4, the heatsink receiving holes 401 may be configured to allow a portion of the heatsinks 1608 to be matingly secured by the heatsink receiving holes 401. The heatsink receiving holes 401 may be configured to allow for the securement of portions of the electronic components of the apparatus 10 with the heatsink receiving holes 401. The heatsinks 1608 and/or the electronic components may be secured with the heatsink receiving holes 401 by fasteners, adhesives, clasps, bolts, screws, wedges, solder, and any other way of securing the heatsinks 1608 onto the heatsink receiving holes 401 as understood by those skilled in the art. The heatsinks 1608 may comprise a device capable of thermal energy transfer, for example, without limitation, an aluminum heatsink, a copper heatsink, a solid metal heatsink, a pumped liquid heatsink, a two-phase heatsink, a finned heatsink, and others as understood by those skilled in the art as an effective way for thermal energy transfer. The heatsinks 1608 may be configured to abutingly engage the electronic components of the apparatus 10, the side members 106, the square material testers 602, the organic and ceramic material tester 603, the bonded material tester 604, and the front plate members 605 to facilitate transfer of thermal energy to and from the heatsinks 1608. The heatsinks 1608 may be configured to allow for a variety of configurations of placement, size, attachment, number, and variety of the heatsinks 1608 used for an embodiment of the present invention.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A test platform apparatus to test materials in a space setting, the system comprising:
   a lower member;
   an upper member;
   a plurality of rear support members extending between the upper member and the lower member;
   a plurality of medial support members extending between the upper member and the lower member;
   a plurality of front support members extending between the upper member and the lower member;
   a plurality of side members extending between the lower member and the upper member;
   a plurality of attachment members carried by an external surface of the lower member and configured to connect to a portion of an external platform;
   a plurality of mounting members carried by an internal surface of at least one of the lower member and the side members; and
   a plurality of heatsinks connected to the internal surface of the lower member;
   wherein the lower member has a plurality of heatsink receiving holes formed therein;
   wherein each of the plurality of heatsink receiving holes are adapted to receive portions of the heatsinks to connect the plurality of heatsinks to the internal surface of the lower member;
   wherein the plurality of heatsinks are configurable and moveable on the internal surface of the lower member.

2. The apparatus according to claim 1 wherein the plurality of rear support members, medial support members and front support members comprise a groove formed therein; wherein the plurality of side members have side portions that are configured to fit within the groove so that side members matingly engage the rear support members, the medial support members and the front support members.

3. The apparatus according to claim 1 wherein the plurality of side members comprises at least one front side panel, at least one lower rear side panel, and at least one upper rear side panel.

4. The apparatus according to claim 1 wherein the plurality of front support members comprises a pair of opposing front corner support members and at least one front medial support member; and further comprising at least one front plate member that matingly engage at least one of the pair of front corner support members and the at least one front medial support member.

5. The apparatus according to claim 4 wherein the at least one front plate member is a composite material tester.

6. The apparatus according to claim 1 further comprising of at least one material tester configured to be connected to at least one of the mounting members.

7. The apparatus according to claim 6 wherein the at least one material tester is at least one of a square material tester, a bonded material tester, and an organic and ceramic material tester.

8. The apparatus according to claim 1 further comprising a power supply and a power distribution board in connection with the power supply.

9. The apparatus according to claim 8 further comprising a communication system connected to the power distribution board; wherein the communication system comprises:
- a wireless transceiver device;
- a data transfer device; and
- a data storage device.

10. The apparatus according to claim 9 further comprising of a flight computer in communication with the communication system and connected to the power distribution board.

11. The apparatus according to claim 9 further comprising at least one camera in communication with the communication system and connected to the power distribution system.

12. The apparatus according to claim 9 further comprising of a global positioning satellite (GPS) device in communication with the communication system and connected to the power distribution board.

13. The apparatus according to claim 8 further comprising:
- a sensor system connector member connected to and extending outwardly from at least one of the side members and the lower member; and
- a sensor system carried by the sensor system connector member and positioned in communication with the power distribution board and the communication system.

14. The apparatus according to claim 13 wherein the sensor system comprises:
- a sensor bracket connected to the sensor system connector member;
- an upper sensor connected to an upper portion of the sensor bracket; and
- a lower sensor connected to a lower portion of the sensor bracket.

15. A test platform apparatus to test materials in a space setting, the system comprising:
- a lower member;
- an upper member;
- a plurality of rear support members extending between the upper member and the lower member;
- a plurality of medial support members extending between the upper member and the lower member;
- a plurality of front support members extending between the upper member and the lower member;
- a plurality of side members extending between the lower member and the upper member;
- a plurality of attachment members carried by an external surface of the lower member and configured to connect to a portion of an external platform;
- a plurality of mounting members carried by an internal surface of at least one of the lower member and the side members;
- a plurality of heatsinks connected to the internal surface of the lower member;
- at least one material tester configured to be connected to at least one of the mounting members;
- a power supply; and
- a power distribution board in connection with the power supply;
- wherein the material tester is least one of a square material tester, a bonded material tester, and an organic and ceramic material tester;
- wherein the lower member has a plurality of heatsink receiving holes formed therein;
- wherein each of the plurality of heatsink receiving holes are adapted to receive portions of the heatsinks to connect the plurality of heatsinks to the internal surface of the lower member; and
- wherein plurality of heatsinks are configurable and moveable on the internal surface of the lower member.

16. The apparatus according to claim 15 wherein the plurality of rear support members, medial support members and front support members comprise a groove formed therein; wherein the plurality of side members have side portions that are configured to fit within the groove so that side members matingly engage the rear support members, the medial support members and the front support members.

17. The apparatus according to claim 15 wherein the plurality of side members comprises at least one front side panel, at least one lower rear side panel, and at least one upper rear side panel.

18. The apparatus according to claim 15 wherein the plurality of front support members comprises a pair of opposing front corner support members and at least one front medial support members; and further comprising at least one front plate members that matingly engage at least one of the pair of front corner support members and the at least one front medial support member.

19. The apparatus according to claim 18 wherein the at least one front plate member is a composite material tester.

20. The apparatus according to claim 15 further comprising a communication system connected to the power distribution board and comprising:
- a wireless transceiver device;
- a data transfer device; and
- a data storage device.

21. The apparatus according to claim 20 further comprising:
- a sensor system connector member connected to and extending outwardly from at least one of the side members and the lower member; and
- a sensor system carried by the sensor system connector member and positioned in communication with the power distribution board and the communication system.

22. The apparatus according to claim 21 wherein the sensor system comprises:
- a sensor bracket connected to the sensor system connector member;
- an upper sensor connected to an upper portion of the sensor bracket; and
- a lower sensor connected to a lower portion of the sensor bracket.

23. The apparatus according to claim 20 further comprising of a flight computer in communication with the communication system and connected to the power distribution board.

24. The apparatus according to claim 20 further comprising of at least one camera in communication with the communication system and connected to the power distribution system.

25. The apparatus according to claim 20 further comprising of a global positioning satellite (GPS) device in communication with the communication system and connected to the power distribution board.

26. A test apparatus system to test materials in a space setting, the system comprising:
- a lower member;
- an upper member;
- a plurality of rear support members extending between the upper member and the lower member;

a plurality of medial support members extending between the upper member and the lower member;

a plurality of front support members extending between the upper member and the lower member;

a plurality of side members extending between the lower member and the upper member;

a plurality of attachment members carried by an external surface of the lower member and configured to connect to a portion of an external platform;

a plurality of mounting members carried by an internal surface of at least one of the lower member and the side members;

a plurality of heatsinks connected to the internal surface of the lower member;

a power supply;

a power distribution board in connection with the power supply;

a communication system connected to the power distribution board and comprising a wireless transceiver device, a data transfer device and a data storage device;

a sensor system connector member connected to and extending outwardly from at least one of the side members and the lower member;

a sensor bracket connected to the sensor system connector member;

an upper sensor connected to an upper portion of the sensor bracket;

a lower sensor connected to a lower portion of the sensor bracket; and wherein the upper sensor and the lower sensor are in communication with the power distribution board and the communication system;

wherein the lower member has a plurality of heatsink receiving holes formed therein;

wherein each of the plurality of heatsink receiving holes are adapted to receive portions of the heatsinks to connect the plurality of heatsinks to the internal surface of the lower member; and wherein plurality of heatsinks are configurable and moveable on the internal surface of the lower member.

27. The apparatus according to claim 26 wherein the plurality of rear support member, medial support members and front support members comprise a groove formed therein; wherein the plurality of side members have side portions that are configured to fit within the groove so that side members matingly engage the rear support members, the medial support members and the front support members.

28. The apparatus according to claim 26 wherein the plurality of side members comprises at least one front side panel, at least one lower rear side panel, and at least one upper rear side panel.

29. The apparatus according to claim 26 wherein the plurality of front support members comprises a pair of opposing front corner support members and at least one front medial support members; and further comprising at least one front plate members that matingly engage at least one of the pair of front corner support members and the at least one front medial support member.

30. The apparatus according to claim 29 wherein the at least one front plate member is a composite material tester.

31. The apparatus according to claim 26 further comprising of at least one material tester configured to be connected to at least one of the mounting members.

32. The apparatus according to claim 31 wherein the material tester is least one of a square material tester, a bonded material tester, an organic and ceramic material tester and a ceramic material tester.

33. The apparatus according to claim 26 further comprising of a flight computer in communication with the communication system and connected to the power distribution board.

34. The apparatus according to claim 26 further comprising of at least one camera in communication with the communication system and connected to the power distribution system.

35. The apparatus according to claim 26 further comprising of a global positioning satellite (GPS) device in communication with the communication system and connected to the power distribution board.

* * * * *